Patented Feb. 22, 1949

2,462,175

UNITED STATES PATENT OFFICE 2,462,175

ARYL AZO SULFONIC ACID SALTS OF STREPTOTHRICIN AND STREPTOMYCIN

Karl Folkers, Plainfield, N. J., assignor to Merck & Co., Inc., Rahway, N. J., a corporation of New Jersey No Drawing. Application June 23, 1945, Serial No. 601,335

23 Claims. (Cl. 260—210)

This invention relates to the purification of therapeutically valuable antibiotic substances, particularly to the purification of water-soluble, basic antibiotic substances obtained by cultivation of strains of micro-organisms of the genus Actinomyces in suitable culture medium, and to new compounds useful in preparing salts of such antibiotic substances having a potency higher than that obtainable by previously known procedures.

It has been shown that antibiotic substances of this type such as streptothricin (Waksman and Woodruff; Proceedings of the Society for Experimental Biology and Medicine 49, 207–210 (1942), and streptomycin (Schatz, Bugie, and Waksman; Proceedings of the Society for Experimental Biology and Medicine 55, 66–69 (1944)) can be isolated from culture media as crude hydrochloride salts. In a pending application of A. Walti, Serial No. 577,143, filed February 9, 1945, a process is disclosed for obtaining crude lower aliphatic carboxylic acid salts of streptothricin and streptomycin by adsorbing streptothricin or streptomycin from culture media on activated charcoal and eluting the adsorbate with a dilute solution of a lower aliphatic carboxylic acid.

The acid salts of streptothricin and streptomycin obtained by the methods referred to above are crude concentrates having low potency or activity and containing admixed organic and inorganic impurities. Such crude concentrates are not particularly suitable for therapeutic administration because the low potency requires use of large quantities of the crude materials to provide an effective therapeutic dose; and further because the extraneous materials present in the concentrates may cause undesired physiological reactions.

In an application by Graber and Peck filed concurrently herewith, Serial No. 601,338, filed June 23, 1945, a process is disclosed for preparing, from the crude concentrates above mentioned, picric acid salts of the Actinomyces elaboration products which can be isloated in essentially pure form and/or converted to mineral acid salts having a markedly increased potency as compared with the original concentrates.

In another concurrently filed application by Robert L. Peck, Serial No. 601,337, filed June 23, 1945, a process is disclosed by which acid salts of Actinomyces elaboration products of the types, and prepared by the procedures, above mentioned are subjected to selective adsorption and elution to yield products having a unit potency 1½–2½ or more times the unit potency of the material so treated.

By employing two or more of the procedures above mentioned mineral acid salts of the Actinomyces elaboration products having an activity of the order of 400 units/mg. or, in some instances, slightly higher can readily be obtained. (A unit of activity is that amount of material which will inhibit the growth of a standard strain of *Esherichia coli* in 1 ml. of a suitable culture medium.) Mineral acid salts of this order of activity are therapeutically useful but due to the fact that these products still contain considerable amounts of impurities uniformity of product in quantity production is difficult or impossible to attain, and it is therefore both difficult and inconvenient to ascertain amounts of these substances which may be properly and/or safely administered therapeutically.

It is now discovered in accordance with the present invention that mineral acid salts of Actinomyces elaboration products having an activity of the order of 800–900 units/mg. can be prepared by first reacting the antibiotic acid salt with an alkaline salt of an arylazo sulfonic acid thereby forming a crystalline antibiotic salt of the arylazo sulfonic acid which can be readily purified and converted to an antibiotic mineral acid salt. For example, upon reacting the sodium salt of helianthine with a crude streptothricin or streptomycin hydrochloride in a suitable solvent medium, the crystalline streptothricin or streptomycin salt of helianthine is obtained and, upon purification and treatment with a mineral acid, these helianthine salts are converted to the corresponding substantially pure streptothricin or streptomycin mineral acid salts.

Regarded in certain of the broader aspects the novel products and processes of the present invention comprises the crystalline arylazo sulfonic acid salts of water-soluble, basic Actinomyces elaboration products and the process for preparing the same and for utilizing them in preparing substantially pure mineral acid salts of such elaboration products by reacting a crude antibiotic substance of the class consisting of acid salts of water-soluble, basic Actinomyces elaboration products with an alkaline salt of an arylazo sulfonic acid in a suitable solvent medium, purifying the antibiotic salt of the arylazo sulfonic acid obtained, and treating the same with a mineral acid to form the corresponding antibiotic mineral acid salt.

In carrying out the process of the present invention, antibiotic acid salts having a potency of the order of 400 units/mg. or higher are preferably employed. Concentrates of lower potency can be reacted with an alkaline salt of an arylazo sulfonic acid to yield the desired product but the product thus obtained is difficult to purify and the yield is markedly lower than when the more potent concentrates are employed.

Alkaline salts of arylazo sulfonic acids, which yield crystalline complexes when reacted with acid salts of Actinomyces elaboration products, include alkaline salts of helianthine (p-dimethylaminophenylazobenzene sulfonic acid), orange II (p-(2-hydroxy-1-naphthylazo)-benzene sulfonic acid) and the like. Reaction between the alkaline salt of the arylazo sulfonic acid and the antibiotic acid salt is a metathetical reaction which is preferably conducted at about room temperature although temperatures up to about 100° C. can be employed. The reaction is conducted in a solvent medium comprising water, methanol, or an aqueous solution of a lower aliphatic alcohol; most favorable results being obtained when methanol or an aqueous solution of a lower aliphatic alcohol is used as the solvent medium. Reaction is effected by merely agitating approximately equivalent amounts of the reactants in the selected solvent until conversion to the complex salt is substantially complete. One to three hours of agitation may be required at room temperature whereas agitation for ¼ to ½ hour will suffice at temperatures of the order of 45° C., and at higher temperatures, viz., temperatures of the order of 70° C., the reaction takes place almost immediately upon mixing the reactants. Most favorable results are obtained, however, by conducting the reaction at or near room temperature.

When the reaction is complete, the reaction mixture is allowed to stand at room temperature or preferably at a lower temperature of the order of 5° C. for 12 to 20 hours during which time the complex antibiotic salt of the arylazo sulfonic acid crystallizes out. The crystalline product thus obtained is filtered off, washed with a suitable solvent and dried or, if desired, it can be purified by recrystallization from lower aliphatic alcohols, mixtures thereof, or aqueous solutions of lower aliphatic alcohols.

The streptothricin salt of helianthine, prepared and purified by the foregoing procedure, is a bronze colored crystalline product having an activity of about 450 units/mg. and melting at about 220–225° C. with decompositon. The streptomycin salt of helianthine is a deep brown-red colored crystalline product having an activity of about 530 units/mg. and melting at about 220–226° C. with decomposition. The streptothricin and streptomycin salts of helianthine can also be distinguished by characteristic biologic specificity; by the difference in the total nitrogen content, approximately 16% for the former and 14.66% for the latter; and by the difference in amino nitrogen content of the corresponding hydrochloride salts regenerated from the helianthine salts, 4% for streptothricin hydrochloride and 0% for streptomycin hydrochloride (by the van Slyke five minute amino nitrogen determination).

From the purified crystalline antibiotic salts of arylazo sulfonic acids substantially pure mineral acid salts of the antibiotic can be prepared by reacting the complex salt with an excess of a mineral acid such as hydrochloric acid, sulfuric acid, phosphoric acid, or the like in water, methanol, or aqueous mixture of lower aliphatic alcohols. The arylazo sulfonic acid liberated in this reaction is removed by filtration and the mineral acid salt of streptothricin or streptomycin is precipitated by pouring the filtrate into a solvent, such as acetone or ether or a mixture thereof, which is miscible with the solution but is a non-solvent for the antibiotic salt. The precipitate thus obtained, when freed of solvent and dried in accordance with conventional methods, is the substantially pure mineral acid salt of the antibiotic. The hydrochlorides of streptothricin and streptomycin prepared in this way show an activity of the order of 800 units/mg. and at temperatures of the order of 200° C. undergo decomposition without exhibiting characteristic melting points.

The following examples illustrate methods of carrying out the present invention, but it is to be understood that these examples are given by way of illustration and not of limitation.

*Example I*

A solution of about 1.15 grams of streptomycin hydrochloride (activity 600–700 units/mg.) in about 100 cc. of water is shaken with a suspension of 1.4 grams of sodium salt of helianthine for about 15 minutes. This solution is then heated to about 45° C. and shaken further for about 10 minutes. The resultant solution is then cooled at about 5° C. for approximately 18 hours causing precipitation of a crystalline product. The crystals of streptomycin salt of helianthine are removed, washed with water, and recrystallized from 75 cc. of hot 50% methanol solution. The crystals so obtained are washed with water, isopropanol, and finally ether to yield the streptomycin salt of helianthine (activity 530 units/mg.)

A portion of the streptomycin helianthate is converted to the hydrochloride by stirring it in an excess of methanol-hydrochloric acid and filtering this slurry with a small quantity of activated carbon. To the resulting filtrate is added sufficient ethyl ether to precipitate completely the streptomycin hydrochloride which is removed and dried under diminished pressure in accordance with conventional methods. The hydrochloride thus obtained has an activity of about 850 units/mg.

*Example II*

To a solution of about 83 mg. of streptothricin hydrochloride (activity of about 538 units/mg.) in about 7 cc. of water, is added about 80 mg. of the sodium salt of helianthine. The resulting mixture is shaken for about 15 minutes, and then permitted to stand overnight at room temperature. This causes precipitation of bronze colored crystals of the streptothricin salt of helianthine which are removed and dried by conventional operations to yield a product having an activity of about 420 units/mg.

*Example III*

A hot solution of about 1.5 grams of sodium salt of helianthine in 50 cc. of water is added to a warm solution of about 1.5 grams of streptomycin hydrochloride (activity about 600 units/mg.) in 25 cc. of methanol. The resulting slurry is shaken for about 15 minutes during which time the brilliant red color of the methyl orange is replaced by the deep brown-red of the streptomycin salt. The solution is permitted to stand at a temperature of about 5° C. for approximately 5 hours, causing precipitation of the streptomycin salt of helianthine. The streptomycin salt of helianthine thus prepared is recrystallized as shown in Example I to obtain a product melting at 220-226° C. with decomposition.

A portion of this product is converted to the hydrochloride according to the procedure described in Example I. The streptomycin hydrochloride has an activity of about 800-900 units/mg. and a rotation $(\alpha)_D = -82.6°$ (C 0.8% in water; dried over phosphorous pentoxide at room temperature).

Example IV

About 675 mg. of streptothricin hydrocloride (activity about 500 units/mg.) is dissolved in about 58 cc. of water to which is added about 675 mg. of the sodium salt of helianthine. The resulting suspension is mixed thoroughly, warmed to approximately 70° C., and then cooled for about 18 hours at a temperature of about 5° C. causing precipitation of bronze colored crystals. The bronze colored crystals consisting of the streptothricin salt of helianthine are recrystallized from aqueous methanol mixtures in accordance with conventional chemical operations to yield substantially pure streptothricin salts of helianthine having an activity of about 450 units/mg. The streptothricin salt of helianthine thus obtained is found to sinter at about 210° C. and to melt with decomposition at about 220-225° C.

About 150 mg. of the crystalline streptothricin salt of helianthine is stirred in 5 cc. of methanol containing about 225 mg. of concentrated aqueous hydrochloric acid and the slurry is then filtered with a small amount of activated charcoal. To the resulting filtrate sufficient ethyl ether is added to precipitate completely the streptothricin hydrochloride which is removed and dried in accordance with conventional methods. The streptothricin hydrochloride thus obtained has an activity of about 800 units/mg.

Example V

To a solution of about 6 grams of streptomycin hydrochloride (activity about 500 units/mg.) in 100 cc. of 50% methanol is added about 4 grams of sodium salt of helianthine and the resulting slurry is stirred mechanically for about 3 hours. The solution is then cooled to about 5° C. for several hours causing precipitation of the streptomycin salt of helianthine which is removed and purified by conventional operations.

Following the procedure shown in Example I, a portion of this streptomycin salt of helianthine is converted to streptomycin hydrochloride having a rotation $(\alpha)_D = -81.3°$ (C 2.0% in water) and an activity of about 800 units/mg.

Example VI

About 1½ grams of sodium salt of helianthine is added to about 2.65 grams of streptomycin hydrochloride (activity about 400 units/mg.) dissolved in 100 cc. of methanol, solution being effected by heating the mixture. The solution is then cooled to about 5° C. for about 18 hours causing precipitation of the crystalline streptomycin salt of helianthine which is recovered by conventional operations.

Following the procedure shown in Example I a portion of this streptomycin salt of helianthine is converted to streptomycin hydrochloride having an activity of about 700-700 units/mg. and a rotation $(\alpha)_D = -79.2$ (C 0.77% in water; dried under diminished pressure at room temperature, but not over phosphorous pentoxide.)

Example VII

About 191 mg. of pure streptomycin salt of helianthine is stirred in 5 cc. of methanol containing about 150 mg. of sulfuric acid. The helianthine thus liberated is removed by filtering this solution through activated carbon. After washing the activated carbon with methanol, the streptomycin sulfate is precipitated from the filtrate by the addition of ether. The amorphous precipitate of streptomycin sulfate thus obtained, is dissolved in a few drops of water, yielding sphenoidal crystals upon slow evaporation of the solvent at room temperature. This crystalline streptomycin sulfate has an activity of about 520 units/mg.

Example VIII

About 100 mg. of streptomycin hydrochloride (activity about 800 units/mg.) is dissolved in 2 cc. of 50% methanol and heated with 100 mg. of orange II (2-naphthol-1-sodium-phenyl-azo-sulfonate.) On cooling this clear solution there is deposited an amorphous orange precipitate which upon recrystallization from methanol yields orange crystals of streptomycin-orange II salt having an activity of about 300 units/mg.

Modifications may be made in carrying out the present invention without departing from the spirit and scope thereof, and the invention is to be limited only by the appended claims.

What is claimed is:

1. A substance of the class consisting of aryl azo sulfonic acid salts of the water-soluble, basic, Actinomyces elaboration products, streptothricin and streptomycin.

2. A substance of the class consisting of helianthine salts of the water-soluble, basic, Actinomyces elaboration products, streptothricin and streptomycin.

3. The streptothricin salt of helianthine.

4. The streptomycin salt of helianthine.

5. The streptothricin salt of p-(2-hydroxy-1-naphthyl-azo)-benzenesulfonic acid.

6. The process that comprises reacting a substance of the class consisting of crude acid salts of the water-soluble, basic, Actinomyces elaboration products, streptothricin and streptomycin, with an alkaline salt of an aryl azo sulfonic acid and recovering the crystalline aryl azo sulfonic acid salt of the elaboration product.

7. The process that comprises reacting a substance of the class consisting of crude acid salts of the water-soluble, basic, Actinomyces elaboration products, streptothricin and streptomycin, with an alkaline salt of an aryl azo sulfonic acid in a solvent medium of the class consisting of water, lower aliphatic alcohols and mixtures thereof and recovering the crystalline aryl azo sulfonic acid salt of the elaboration product.

8. The process that comprises reacting a substance of the class consisting of crude acid salts of the water-soluble, basic, Actinomyces elaboration products, streptothricin and streptomycin, with an alkaline salt of an aryl azo sulfonic acid, reacting the crystalline aryl azo sulfonic acid salt of the elaboration product thus formed with an excess of mineral acid, and recovering the corresponding substantially pure mineral acid salt of the elaboration product.

9. The process that comprises reacting a substance of the class consisting of crude acid salts of the water-soluble, basic, Actinomyces elaboration products, streptothricin and streptomycin, having an activity of the order of 400 units/mg. with an alkaline salt of an aryl azo sulfonic acid and recovering the crystalline aryl azo sulfonic acid salt of the elaboration product.

10. The process that comprises reacting a substance of the class consisting of crude acid salts of the water-soluble, basic, Actinomyces elaboration products, streptothricin and streptomycin, with an alkaline salt of an aryl azo sulfonic acid in a solvent medium of the class consisting of water, lower aliphatic alcohols and mixtures thereof and at a temperature within the range of room temperature to about 100° C. and recovering the crystalline aryl azo sulfonic acid salt of the elaboration product.

11. The process that comprises reacting a substance of the class consisting of crude acid salts of the water-soluble, basic, Actinomyces elaboration products, streptothricin and streptomycin, with an alkaline salt of an aryl azo sulfonic acid in a solvent medium of the class consisting of water, lower aliphatic alcohols and mixtures thereof at about room temperature and recovering the crystalline aryl azo sulfonic acid salt of the elaboration product.

12. The process that comprises reacting a substance of the class consisting of crude acid salts of the water-soluble, basic, Actinomyces elaboration products, streptothricin and streptomycin, with an alkaline salt of an aryl azo sulfonic acid in a solvent medium of the class consisting of water, lower aliphatic alcohols and mixtures thereof and recovering the substantially pure crystalline aryl azo sulfonic acid salt of the elaboration product by recrystallizing the reaction product thus formed from a solvent of the class consisting of lower aliphatic alcohols and aqueous mixtures of lower aliphatic alcohols.

13. The process that comprises reacting a substance of the class consisting of crude acid salts of the water-soluble, basic, Actinomyces elaboration products, streptothricin and streptomycin, with an alkaline salt of an aryl azo sulfonic acid in methanol, and recovering the substantially pure crystalline aryl azo sulfonic acid salt of the elaboration product by recrystallizing the reaction product thus formed from aqueous methanol.

14. The process that comprises reacting a substance of the class consisting of crude acid salts of the water-soluble, basic, Actinomyces elaboration products, streptothricin and streptomycin, with an alkaline salt of helianthine and recovering the crystalline helianthine salt of the elaboration product.

15. The process that comprises reacting a substance of the class consisting of crude acid salts of the water-soluble, basic, Actinomyces elaboration products, streptothricin and streptomycin, with the sodium salt of helianthine and recovering the crystalline helianthine salt of the elaboration product.

16. The process that comprises reacting a crude acid salt of streptothricin with an alkaline salt of an aryl azo sulfonic acid and recovering the crystalline aryl azo sulfonic acid salt of streptothricin.

17. The process that comprises reacting a crude acid salt of streptomycin with an alkaline salt of an aryl azo sulfonic acid and recovering the crystalline aryl azo sulfonic acid salt of streptomycin.

18. The process that comprises reacting a crude acid salt of streptothricin with the sodium salt of helianthine in a solvent medium of the class consisting of water, lower aliphatic alcohols and mixtures thereof and recovering the crystalline streptothricin salt of helianthine thus formed.

19. The process that comprises reacting a crude acid salt of streptomycin with the sodium salt of helianthine in a solvent medium of the class consisting of water, lower aliphatic alcohols and mixtures thereof and recovering the crystalline streptomycin salt of helianthine thus formed.

20. The process that comprises reacting a crude acid salt of streptothricin with the sodium salt of helianthine in a solvent medium of the class consisting of water, lower aliphatic alcohols and mixtures thereof, reacting the crystalline streptothricin salt of helianthine thus formed with an excess of mineral acid and recovering the corresponding substantially pure mineral acid salt of streptothricin.

21. The process that comprises reacting a crude acid salt of streptothricin with the sodium salt of helianthine in methanol and recovering the substantially pure crystalline streptothricin salt of helianthine from the reaction product thus formed by recrystallization from aqueous methanol.

22. The process that comprises reacting a crude acid salt of streptomycin with the sodium salt of helianthine in methanol and recovering the substantially pure crystalline streptomycin salt of helianthine from the reaction product thus formed by recrystallization from aqueous methanol.

23. The process that comprises reacting a crude acid salt of streptomycin with the sodium salt of helianthine in a solvent medium of the class consisting of water, lower aliphatic alcohols and mixtures thereof, reacting the crystalline streptomycin salt of helianthine thus formed with an excess of mineral acid and recovering the corresponding substantially pure mineral acid salt of streptomycin.

KARL FOLKERS.

REFERENCES CITED

The following references are of record in the file of this patent:

UNITED STATES PATENTS

| Number | Name | Date |
|---|---|---|
| 1,674,128 | Rose | June 19, 1928 |
| 1,860,036 | Kranzlein et al. | May 24, 1932 |

OTHER REFERENCES

Schaltz et al., Proc. Soc. Exper. Bio. and Med., Jan. 1944, pages 66–69

Waksman, "Microbial Antagonisms and Antibiotic Substances," March 1945, pages 172, 173, 175 (3 pages).